United States Patent [19] [11] Patent Number: 4,731,822
Berry, III et al. [45] Date of Patent: Mar. 15, 1988

[54] HELD PARTY NOTIFICATION FEATURE

[75] Inventors: Chester A. P. Berry, III, Thornton, Colo.; Anna M. Tolaini, Marina Di Massa, Italy

[73] Assignee: American Telephone and Telegraph Company and AT&T Information Systems Inc., Holmdel, N.J.

[21] Appl. No.: 794,536

[22] Filed: Nov. 4, 1985

[51] Int. Cl.$^4$ .................. H04M 1/00; H04M 3/56
[52] U.S. Cl. .................. 379/204; 379/163; 379/52
[58] Field of Search ............... 379/158, 157, 163, 162, 379/164, 393, 204, 203, 205, 202, 52, 215

[56] References Cited

U.S. PATENT DOCUMENTS

| Re. 29,078 | 12/1976 | Tate | 379/162 |
|---|---|---|---|
| 3,961,142 | 6/1976 | Caffine | 379/162 |
| 3,963,873 | 6/1976 | Pommerening et al. | 379/201 |
| 4,028,502 | 6/1977 | Moricca et al. | 379/52 |
| 4,081,625 | 3/1978 | Hamatani et al. | 379/163 |
| 4,169,216 | 9/1979 | Overdulve et al. | 379/163 |
| 4,194,093 | 3/1980 | Davis, Jr. et al. | 379/162 |
| 4,228,324 | 10/1980 | Rasmussen et al. | 379/163 |
| 4,258,232 | 3/1981 | Smith et al. | 379/393 |
| 4,365,117 | 12/1982 | Curtis | 379/393 |
| 4,424,418 | 1/1984 | Moore et al. | 379/204 |
| 4,425,479 | 1/1984 | Dubner et al. | 379/87 |

FOREIGN PATENT DOCUMENTS

| 0010766 | 2/1981 | Japan | 379/393 |
|---|---|---|---|
| 0058356 | 5/1981 | Japan | 379/215 |
| 0114954 | 7/1984 | Japan | 379/209 |
| 0136498 | 7/1985 | Japan | 379/164 |

OTHER PUBLICATIONS

"Touch-Fone for the Blind", brochure and instruction sheet, Telephone Equipment Corp., Feb. 1977.

Primary Examiner—Thomas W. Brown
Attorney, Agent, or Firm—David Volejnicek

[57] ABSTRACT

This invention provides an audible indication to a held party indicating when a call is removed from the hold state. Heretofore, when two parties on a call are in a talk state and a first party puts a second party on hold, the held party must aurally monitor the receiver on the station set for the first party's voice to detect when the talk state is resumed. The voice of the first party provides the only indication that the hold condition has been removed. This requires the held party to monitor the receiver for the duration of the hold state and prevents the held party from easily pursuing any other activities. The subject arrangement overcomes this problem by providing a "ring-ping" signal to the held party when the hold condition is removed. In particular, following the activation of the hold condition by the first party, the held party leaves the receiver off-hook and can then pursue other activities. Call processing software monitors the station set of the first party to detect the removal of the hold condition. In response to the detection of the removal of the hold condition, a "ring-ping" signal (a short burst of ringing) is applied to the hold party's station set to indicate that the call is no longer on hold. The talk state can then resume as soon as the held party retrieves the receiver. The above-described arrangement eliminates the need for the held party to aurally monitor the station set receiver for the duration of the hold condition.

14 Claims, 8 Drawing Figures

FIG. 3
STATION STATUS TABLE

| STATION IDENTITY | ON-HOOK | OFF-HOOK |
|---|---|---|
| 100-0 | 0 | 1 |
| 100-1 | 0 | 1 |
| 100-2 | 0 | 1 |
| 100-3 | 1 | 0 |
| 100-4 | 0 | 1 |
| 100-5 | 0 | 1 |
| ... | ... | ... |
| 100-n | 1 | 0 |

PRE-HOLD

| STATION IDENTITY | ON-HOOK | OFF-HOOK |
|---|---|---|
| 100-0 | 0 | 1 |
| 100-1 | 0 | 1 |
| 100-2 | 1 | 0 |
| 100-3 | 1 | 0 |
| 100-4 | 0 | 1 |
| 100-5 | 1 | 0 |
| ... | ... | ... |
| 100-n | 1 | 0 |

POST-HOLD

FIG. 4
CALL STATUS TABLE

| IDENTIFIED STATION | CALL CONNECTION IDENTITY | STATES TALK | NON-TALK |
|---|---|---|---|
| → 100-0 | A | 1 | 0 |
| 100-0 | B | 0 | 1 |
| 100-1 | A | 1 | 0 |
| 100-3 | – | 0 | 1 |
| 100-2 | B | 1 | 0 |
| 100-4 | C | 1 | 0 |
| 100-5 | B | 1 | 0 |
| ⋮ | ⋮ | ⋮ | ⋮ |
| 100-n | Nn | 1 | 0 |

PRE-HOLD

| IDENTIFIED STATION | CALL CONNECTION IDENTITY | STATES TALK | NON-TALK |
|---|---|---|---|
| → 100-0 | A | 0 | 1 |
| 100-0 | – | 0 | 1 |
| 100-1 | A | 1 | 0 |
| 100-3 | – | 0 | 1 |
| 100-2 | B | 1 | 0 |
| 100-4 | C | 1 | 0 |
| 100-5 | B | 1 | 0 |
| ⋮ | ⋮ | ⋮ | ⋮ |
| 100-n | Nn | 1 | 0 |

POST-HOLD

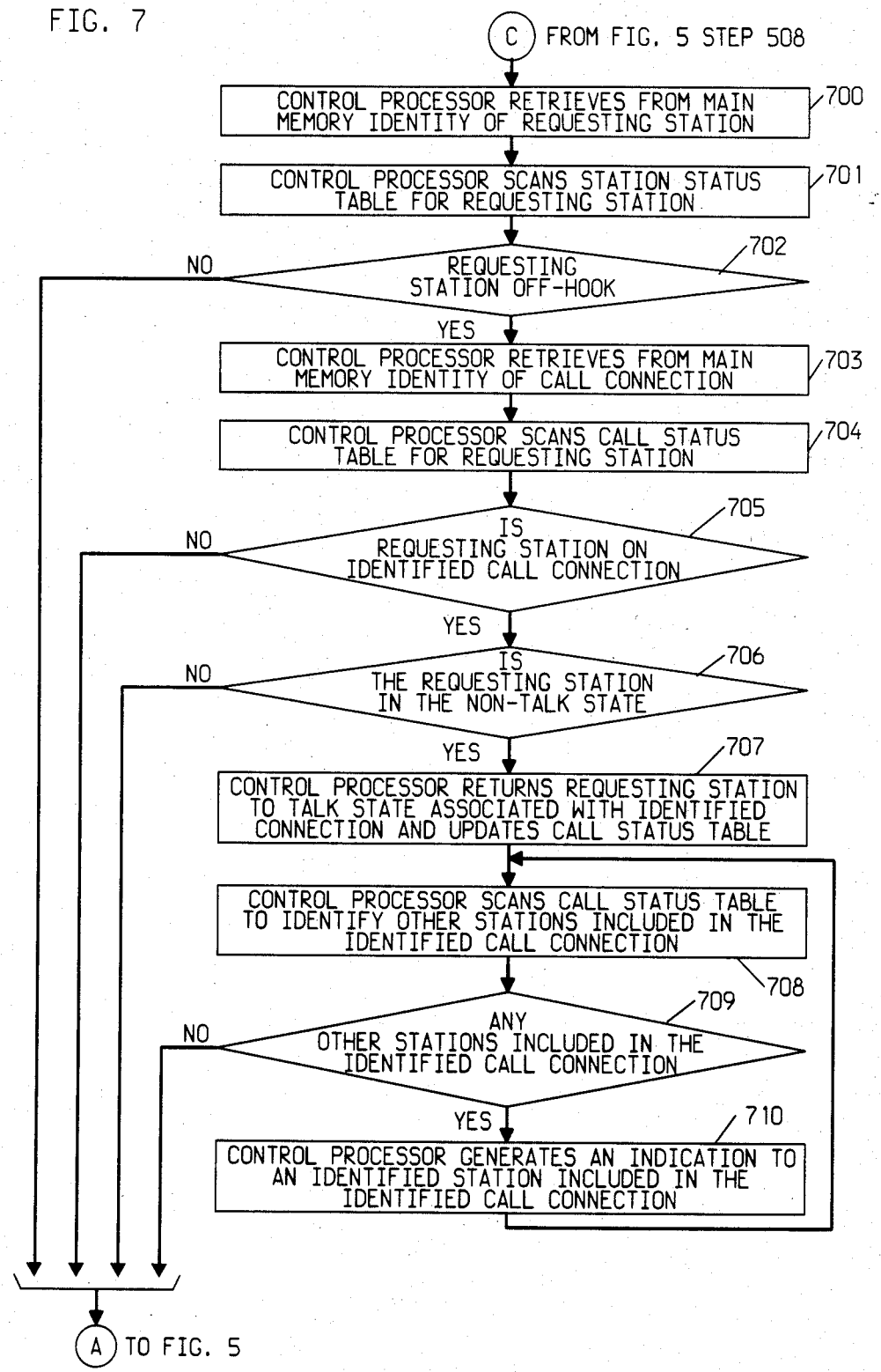

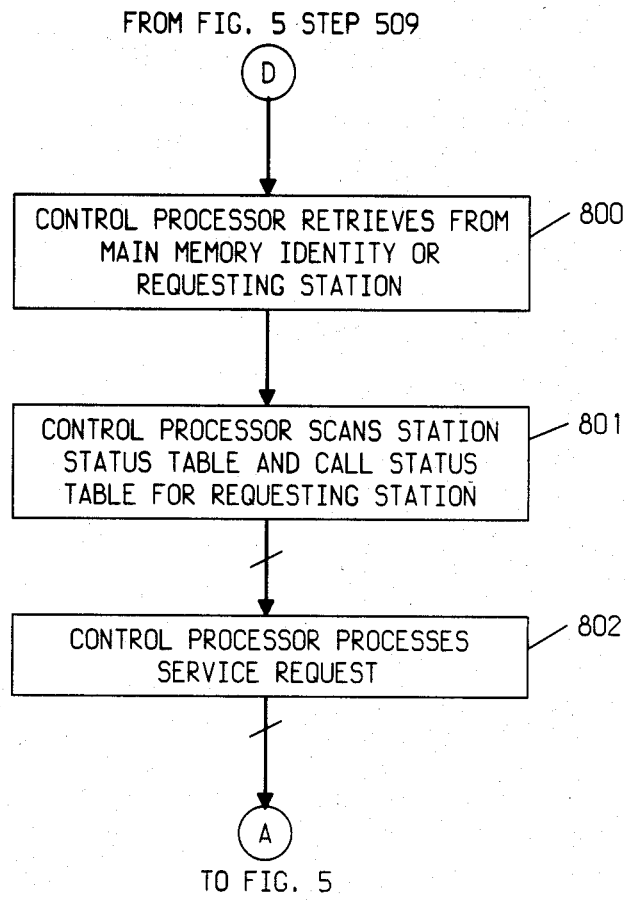

HELD PARTY NOTIFICATION FEATURE

TECHNICAL FIELD

This invention relates to Private Branch Exchanges (PBX's) and, in particular, to held party notification facilities for a PBX. The invention further relates to facilities for immediately alerting a held party that a hold condition has been removed by an activating party, and that a voice connection has been re-established between the activating party and the held party.

BACKGROUND OF THE INVENTION

Private Branch Exchanges (PBX's) have increased in complexity and sophistication over the years and offer users a wide variety of features and capabilities that are activated by a user from multi-function station sets. Multi-function station sets typically have multiple call appearances which allow the user to have multiple active concurrent independent call connections. The user, however, can only talk on one call connection at a time. To maintain multiple active call connections, the user activates a "hold feature" to keep the remaining call connections active but in a "non-talk" state. The user can maintain several calls "on-hold" while conversing with another party or parties (e.g. conference connections). Although the hold feature is convenient to the user or activating party, the held party must aurally monitor the station's receiver for the return of the voice of the activating party to ascertain the conclusion of the hold interval and the re-establishment of the "talk" state. The held party, as a result of aural monitoring during the hold interval, suffers a number of inconveniences such as waiting an uncomfortably long period of time, wasting valuable time, and enduring restricted activity.

Many systems and devices have been proposed in an effort to alleviate these inconveniences to the held party. One such device applies soothing music on the station line during the hold interval so as to entertain the held party. Another system measures the time duration of the hold interval, and then drops the call connection after some period of time elapses. Other arrangements provide a "winking" lamp on the station of an activating party to serve as a reminder to the activating party that an existing call connection is "on-hold". Despite the above-described attempts to alleviate the inherent annoyances to the held party, the held party must still aurally monitor the station's receiver for the entire hold interval to detect the activating party's voice which signals the resumption of the "talk" state connection between the held and activating parties.

Schemes have been proposed which eliminate the need for the held party to aurally monitor the receiver of the station set by providing an indication to the held party that signals the return of the activating party's voice and the conclusion of the hold interval. One such voice detection scheme is disclosed in U.S. Pat. No. 3,961,142 issued to George S. Caffine on Jun. 1, 1976. Caffine discloses an arrangement wherein each station is equipped with a hard-wired voice detection circuit which is activated by the held party during a hold state. The circuit monitors the held party's station line during the hold state to detect the presence of a voice signal thereon. An annunciation signal is generated by the detection circuit in response to the detection of voice on the station's line signaling the resumption of the "talk" state between the held party and the activating party. The voice detection circuit eliminates the need for the held party to aurally monitor the station's receiver.

There are several disadvantages associated with the Caffine and similar voice-detection arrangements. These arrangements typically disclose a hard-wired voice detection circuit which is dependent on the tip/ring architecture of an analog key system. This circuit detects electrical changes in the voltage applied to the tip/ring conductors and activates an annunciation signal in response to the detection of a voltage change. These voice detection arrangements are appropriate for analog environments where changes in electrical signals control the interconnections between stations; however such voice detection arrangements are inapplicable to digital environments where interconnections between stations occur in response to call processing algorithms which generate digital messages. Therefore, the application of these voice detection arrangements is limited to analog environments which are based on tip/ring architecture.

Another disadvantage of the voice detection arrangements is that the voice detection circuit links the detected changes in the electrical signals on the tip/ring conductors to the appearance of voice on the station line. Arrangements that rely on changes in electrical signals to indicate a particular condition are not reliable since changes in the electrical signals could occur as a result of noise appearing on a line. The noise could trigger the circuit and provide a false indication as to the appearance of voice on the station line. Additionally, the circuit does not discriminate the activating party's voice from other voices that can appear on the station's line. The circuit could then generate the annunciation signal in response to the "music on-hold" feature, cross-talk or the appearance of other conferees' voices on the line where a conference connection exists.

A further disadvantage associated with these voice detection arrangements is that the voice detection circuit is not triggered until a voice signal is detected and therefore, if the activating party does not immediately speak at the conclusion of the hold interval—a delay in conversation between the activating and held parties occurs. One other disadvantage of these arrangements is that physical modification to an existing station set is required to provide this feature to a user.

Therefore, there exists a need to develop a held party notification arrangement which is independent of the tip/ring architecture, operates in the digital environment and provides an immediate and "true" notification to the held party that the hold condition has been removed and the "talk" state connection has been re-established. Additionally, an arrangement is desired that requires no hardware modification and is implemented in an economical manner.

SUMMARY OF THE INVENTION

To overcome the above-described disadvantages and inconveniences, the disclosed arrangement provides a held party notification feature for the digital PBX which immediately generates an indication (e.g. ringping) to the held party when the hold interval is concluded and the "talk" state connection has been re-established between the activating and held parties.

In a digital PBX, a control processor establishes and disengages connections between parties based on the application of call processing algorithms stored in the control processor. The algorithms are implemented to process service requests received from stations where each service request is associated with a specified algorithm.

To implement the held party notification feature, assume that two parties are connected but are in the non-talk state, i.e. party A places party B on-hold by depressing the hold button on a multi-function station set. Party B, the held party, may now set down the receiver and proceed with other activities during the hold interval. Party B does not need to aurally monitor the station's receiver during the hold interval. When party A wishes to resume "talking" with party B, party A depresses the call appearance button associated with the held call to remove the hold condition i.e. party A generates an "un-hold" service request. In response to this "un-hold" service request, the control processor implements an associated algorithm. This algorithm detects the current state, i.e. "off-hook" or "on-hook", and status, i.e. "talk" or "non-talk", of the station generating the service request. The appropriate current state and status of a requesting station for an "un-hold" service request is "off-hook" and "non-talk". These conditions indicate the hold condition can be removed by the activating party and that the voice connection between the parties, A and B, can be reestablished. The control processor, in response to the detection of the "un-hold" service request, immediately identifies the held station (party B) and generates an, e.g. aural, indication to party B announcing the conclusion of the hold interval and the re-establishment of the talk-state. Party B can now pick up the receiver and, immediately, begin conversing with party A.

The disclosed held party notification feature algorithm monitors the state of the requesting station, i.e. the activating party's station, to detect the change from the "hold" to the "un-hold" condition. This feature does not rely on voice confirmation or voice-activated annunciators to indicate the conclusion of the hold interval. Additionally, the disclosed feature requires minimal software modification to an existing system, and does not require expensive and cumbersome hard-wired circuit modifications. Further, the disclosed arrangement provides a "true" indication of the conclusion of the hold interval because the control processor monitors the state and status of the activating party's station rather than relying on the detection of voice on the held party's station line. An annunciation, therefore, is not generated in response to noise or other phenomenon such as music-on-hold, cross-talk or other conferee's voices on the line. In the above arrangement, the held party suffers minimal inconveniences during the hold interval since aural monitoring of the station set's receiver is eliminated.

BRIEF DESCRIPTION OF THE DRAWING

The forgoing and other advantages of this invention will be apparent from the following detailed description of one possible exemplary embodiment thereof, which when read in conjunction with the accompanying drawings, in which;

FIG. 3 illustrates a station status table comprising the memory of the control processor;

FIG. 4 illustrates a call status table comprising the memory of the control processor; and FIGS. 5, 6, 7 and 8 illustrate a flowchart identifying the call processing steps required to implement the held party reminder feature for stations comprising the Private Branch Exchange (PBX).

DETAILED DESCRIPTION

Figure 1:
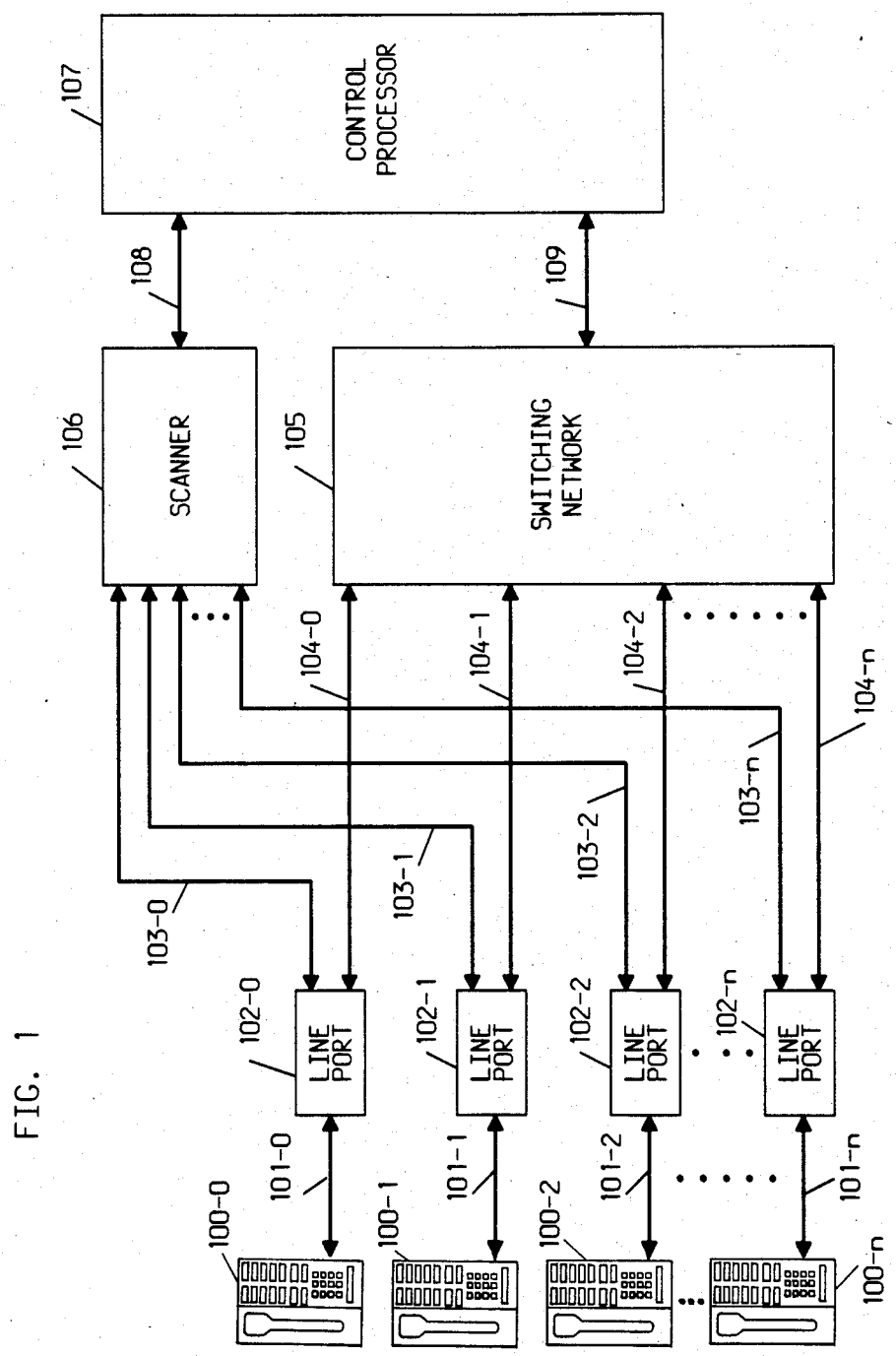
FIG. 1 illustrates a typical Private Branch Exchange (PBX)

FIG. 1 discloses a typical Private Branch Exchange (PBX) serving a plurality of station sets such as 100-0 through 100-n where each station set is connected by paths 101-0 through 101-n to an associated line port circuit 102-0 through 102-n. The associated port circuits 102-0 through 102-n serve as interfaces to switching network 105 and control processor 107 via scanner 106.

Line port circuits 102-0 through 102-n connect over paths 103-0 through 103-n to scanner 106. Scanner 106 connects over path 108 to control processor 107. Control processor 107 is of the stored-program type and controls the interconnections between the station sets 100-0 through 100-n of FIG. 1. Control processor 107 includes a main memory (not shown) which contains various call processing algorithms which are implemented in response to stimulus received from the associated stations. A stimulus may be an "off-hook" or an "on-hook" condition of an associated station. Scanner 106 operates under control of control processor 107. Scanner 106 scans over paths 103-0 through 103-n to detect the appearance of a stimulus indication (eg. "on-hook" or "off-hook") generated at any one of the stations 100-0 through 100-n. The ports 102-0 through 102-n receive signals over leads 101-0 through 101-n from the associated stations 100-0 through 100-n. These signals as generated in response to a stimulus indicating the condition of the stations 100-0 through 100-5. Scanner 106 detects each change in stimulus (e.g. "on-hook" to "off-hook") and applies an indication of the stimulus over path 108 to control processor 107. Control processor 107 responds to this indication and implements call processing algorithms in response to the received stimulus. Control processor 107 responds to station dial signals and generates control information to establish interconnections between the stations. Following the establishment of the interconnections, switching network 105 exchanges information, i.e. "voice or data", between the stations associated with each interconnection. Switching network 105 is controlled by control processor 107 over path 109.

Control processor 107, as previously described, contains a number of call processing algorithms in its main memory. Each call processing algorithm comprises a list of stored instructions to administer routine call processing operations which originate and complete interconnections between the stations. Assume that processor 107 is presently responding to an incoming call where the calling party goes "off-hook" and dials digits which identify a called station. Processor 107 implements an appropriate call processing routine to identify the called station in response to the dialed digits and to provide ring-back to the calling station concurrently with ringing at the called station. Processor 107 controls the interconnection between the calling and the called station in response to the instructions of the call processing algorithm.

The main memory in processor 107 contains various feature processing algorithms in addition to routine call processing algorithms. These feature processing algorithms comprise lists of instructions that specify processing operations. Each feature processing algorithm is associated with a specific service request. A feature request is generated at stations 100-0 through 100-n in FIG. 1 by depressing a feature button appearing on each of the station sets as shown on FIG. 2.

Figure 2:
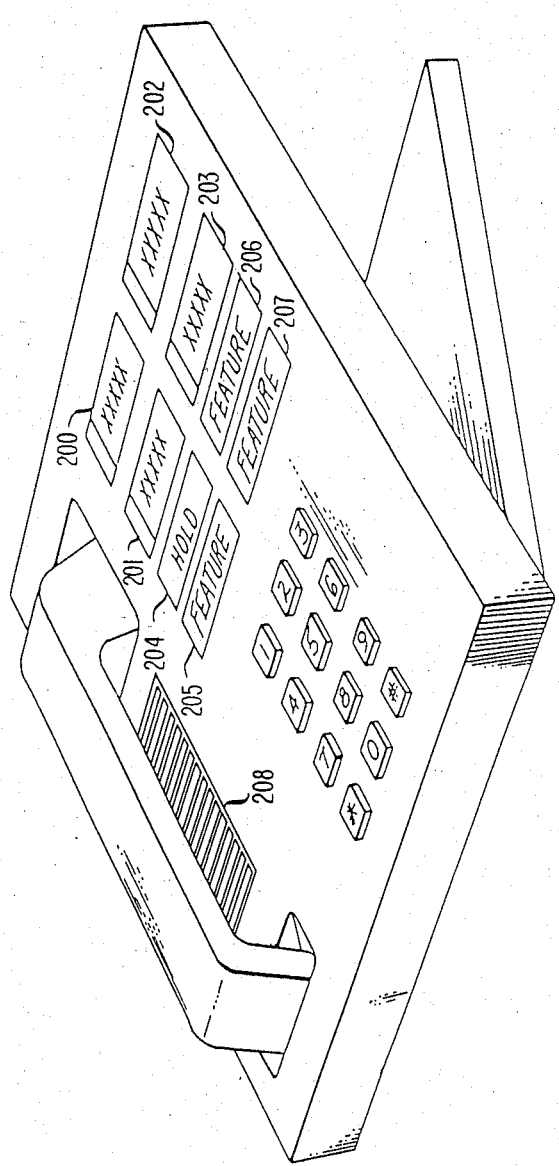
FIG. 2 illustrates a typical multi-function, multi-appearance station set of the digital type.

FIG. 2 illustrates a typical multi-function, multi-appearance, 200 through 203, station set of the digital type. The illustrated station set can concurrently serve up to four active calls. A subscriber depresses a call appearance button followed by the "dialing" of digits to originate an outgoing call, and depresses a lit call appearance button to answer an incoming call. Additionally, the illustrated station set provides a subscriber with a number of feature buttons 204 through 207 where each button is associated with a specific feature. Such features may include conferencing, transfer, drop and hold. A subscriber activates a feature by depressing a feature button, e.g. 205 to generate a service request. In response to each service request, the routine call processing algorithm contained in the main memory of control processor 107 branches to an associated feature call processing routine to serve the service request.

Control processor 107 maintains in its main memory a number of status tables which are established during call processing. Processor 107 continually updates these tables to reflect the current state, e.g. "on-hook", "off-hook", "talk" and "non-talk", associated with each of the station sets of FIG. 1. FIGS. 3 and 4 illustrate examples of these status tables. FIG. 3 illustrates a station status table which indicates the current state of each station 100-0 through 100-n. For example, the pre-hold station status table illustrates that station 100-0 is currently "off-hook", i.e. 1, and that station 100-3 is currently "on-hook", i.e. 1, a "1" is a positive indicator of an associated state. This station status table indicates the hook status of each station. FIG. 4 illustrates a call status table which indicates the current state of each station 100-0 through 100-n on an identified call connection. For example, as the pre-hold call status table illustrates, station 100-0 is in a "talk" state on call connection A, but in a "non-talk" state, i.e. hold on call connection B. Both the station status table and the call status table are continually updated to reflect the current state of each of the stations 100-0 through 100-n with respect to identified call connections. Further details of these tables are discussed subsequently.

The remainder of this description describes the feature processing algorithm associated with the held party notification feature. FIGS. 5, 6, 7 and 8 illustrate in flow chart form the steps required to implement the held party notification feature algorithm. Prior to describing the steps included in the implementation of the subject feature, the following describes the steps required by typical call processing to facilitate the operation of the feature.

Assume that the PBX of FIG. 1 is operating in a conventional manner such that a typical call processing routine is in progress. Call processing, as previously described, establishes and disengages connections between stations and services requests generated by station users. Processor 107 scans via scanner 106 each station 100-0 through 100-n to detect the generation of a stimulus and/or service request. Processor 107, in response to the receipt of a stimulus and/or service request, constantly updates the status tables to indicate the current state of each of the identified stations 100-0 through 100-n during the call processing operations. Call processing performs processing operations based on the information contained in these status tables.

Figure 5:
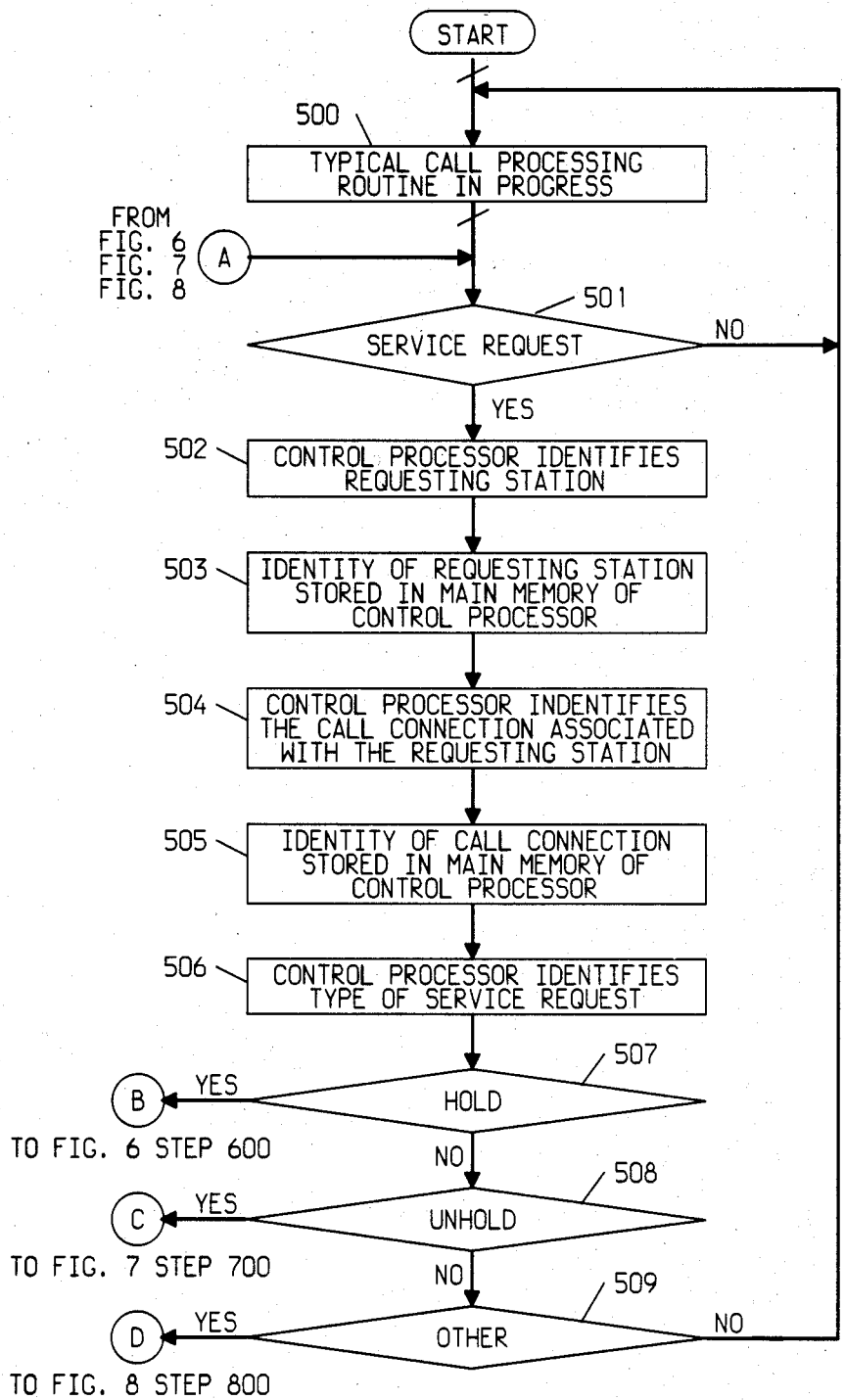

Step 500 of FIG. 5 indicates that typical call processing operations are in progress and assumes that a number of interconnections between various ones of the station sets of FIG. 1 have been established. See the pre-hold station status table of FIG. 3 and pre-hold call status table of FIG. 4. In step 501, if no service request is generated by any of the stations 100-0 through 100-n, processor 107 returns to typical call processing operations prior to step 501. However, if a service request is generated from one of the stations 100-0 through 100-n by a user who depresses, for example, a feature button, such as button 204 illustrated on the station set of FIG. 2, conventional call processing branches to step 502 to a service request routine to serve the request.

Assume for the remainder of this description that station 100-0 is the station generating the request. It is understood that more than one station can generate a request and, that the control processor may service more than one request, concurrently. However, for ease of description assume that only one station, 100-0, is generating a service request at this time. Scanner 106 detects the generated service request over path 103-0 from station 100-0 via the associated line port circuit 102-0. Scanner 106 applies an indication of the service request over path 108 to processor 107. This indication includes information as to: (1) the identity of the station requesting the service; (2) the identity of the active call connection associated with the station requesting the service where, as previously described, each active call connection originating at a single station is assigned a specified identity; and (3) the type of service request generated by the station. In response to the receipt of this service request indication, processor 107 identifies the requesting station, station 100-0 at step 502 and then stores the identity of the requesting station in a location specified in its main memory, step 503. Following the identification of the requesting station, processor 107 identifies the call connection, i.e., connection A or B as shown on the pre-hold call status table of FIG. 4, associated with the requesting station, step 504. Processor 107 stores the identity of the call connection in a specified location of the main memory, step 505. Control processor 107, then, at step 506, identifies the type of service request generated by the identified requesting station.

Assume that the station set user 100-0 generated a service request other than hold, step 507, or un-hold, step 508. The hold and un-hold requests are described subsequently. In response to the "other" service request generated by the station set user depressing either button 205, 206 or 207 on the station set of FIG. 2, processor 107 bypasses steps 507 and 508 and goes to step 509, "other". If the generated service request is unavailable to the user, step 509 returns to the typical call processing routine (step 500) to maintain the established call connection and continues scanning the requesting station until another service request is generated. However, if the service is available, step 509 diverts to an associated feature algorithm to process the received "other" service request.

Call processing diverts to D of FIG. 8. Following identification of the type of service request generated, processor 107 retrieves from its main memory the identity of the requesting station, step 800. Processor 107 then scans the previously described status tables of FIGS. 3 and 4 to detect the current state of the requesting station, step 801. The requesting station must be in the appropriate state to satisfy the request. If the station is not in the appropriate state, the service request is abandoned (step not shown). However, if the requesting station is in the appropriate state, processor 107 processes the service request according to the steps of the associated feature processing routine, step 802. No further details are provided since the processing of "other" feature requests comprises no part of the subject invention. The above merely indicates that the control processor responds to a variety of service requests. Following the processing of the "other" service request, processor 107 returns to point A of FIG. 5. Call processing continues until the next service request is generated, step 501, that requires specialized feature processing.

Assume that typical call processing is in progress and that processor 107 is scanning station 100-0 to detect a service request. Assume further that station 100-0 is currently in the states indicated on the pre-hold status tables of FIGS. 3 and 4: station 100-0 is currently "off-hook", is included in call connections A and B, and is in a "talk" state on call connection A and a "non-talk" state on call connection B. As previously mentioned, since the user has a multi-appearance station set, a station user is capable of participating in more than one active call connection at one time, but can only converse on one call connection at a time. Assume that station 100-0 on call connection A is the requesting station and that a "hold" service request is generated in response to the user of station 100-0 depressing the hold button (204) on the station of FIG. 2. Assume further that control processor 107 has completed steps 501 through 506, as previously described, and identified the service request as a "hold" in step 507 of FIG. 5. If the hold feature is not available, processor 107 does not service the request and returns to step 500. However, assume that "hold" is available to the user and, therefore, processing proceeds on to point B of FIG. 6.

Figure 6:
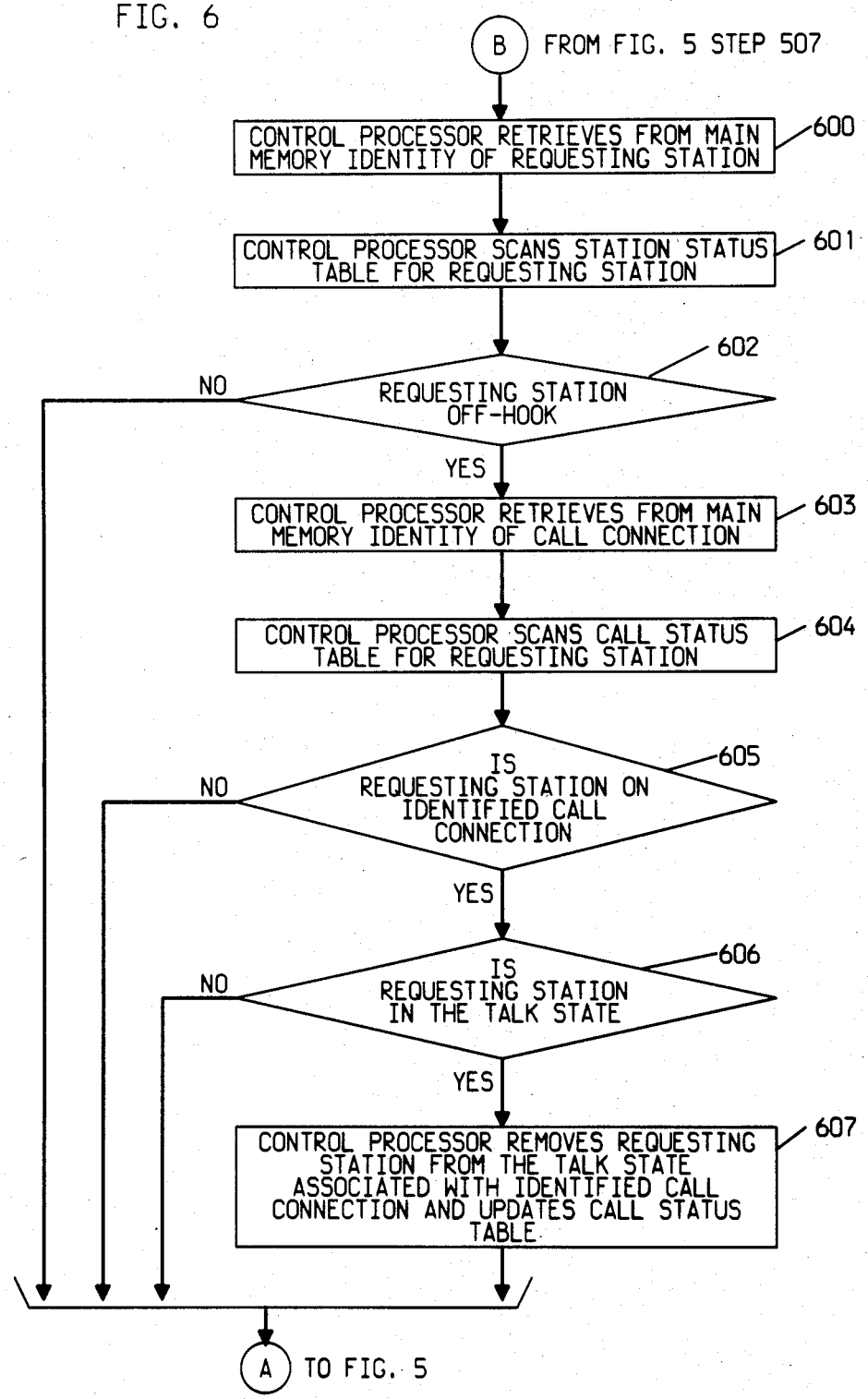

FIG. 6 illustrates the steps required to remove station set 100-0, hereinafter, the requesting station, from the "talk" state of call connection A while still maintaining an active call connection with station set 100-1, that is, station set 100-0 user puts the station set 100-1 user "on-hold". In response to the "hold" service request, processor 107 retrieves the identity of the requesting station, station set 100-0, at step 600. Processor 107 then scans the pre-hold station status table of FIG. 3 to detect the station status of the requesting station, step 601. The pre-hold station status table indicates that the requesting station is currently "off-hook", step 602. If the requesting station was not "off-hook", that is, "on-hook", the routine diverts to point A (FIG. 5) of the call processing routine to await another service request because the station is not in the appropriate state to satisfy the request. An "on-hook" further indicates that there is no existing active call connection. The hold feature is only operable when the requesting station is "off-hook" and the associated user desires to maintain an active call connection with the user at the associated connected station.

Processor 107, following validation of the "off-hook" state at step 602, retrieves the identity of the call connection associated with the requesting station, call connection A, from its main memory at step 603. Control processor 107, concurrently, scans the pre-hold call status table for the requesting station. The pre-hold call status table of FIG. 4 indicates that station set 100-0 is included in connections A and B, step 604. Multi-appearance station set users, as previously described, may participate in several active call connections at one time and therefore, the control processor must apply the connection-otherwise, a feature may be inadvertently applied to the wrong call connection of the requesting station. If the retrieved identified call connection does not match one of the call connections appearing in the call status table, the control processor abandons the "hold" routine at step 605 and processing returns to point A of FIG. 5 to await the next service request. The requesting station, currently, as illustrated in the pre-hold call status table of FIG. 4, has an associated call connection A which matches the retrieved identified call connection A.

Following the determination by processor 107 that the identified call connection is valid, step 605, processor 107 scans the pre-hold call status table of FIG. 4 to detect whether the requesting station is currently in the "talk" state, step 606. If the requesting station is not currently in a "talk" state, that is, "non-talk", with respect to the identified connection, the "hold" service request is inapplicable since there is no voice connection to disengage, and therefore, processor 107 abandons the service request and returns to point A of FIG. 5. Assume, however, as the pre-hold call status table of FIG. 4 indicates, that the requesting station 100-0 associated with connection A is in the "talk" state, 1. Call processing then continues to step 607 in response to a validation of the correct state at step 606. Processor 107, at step 607, removes the requesting station 100-0 from the "talk" state of the identified call connection. Processor 107, concurrently, updates the call status table to reflect the current state of station 100-0 on connection A. Since an active call connection is still maintained, post-hold station status table of FIG. 3 still indicates that station 100-0 is "off-hook" and post-hold call status table of FIG. 4 indicates that station 100-0 is still on connection A, but is now in the "non-talk" state. Station set 100-1 is now on hold, indicating that there is no voice connection between station 100-0 and 100-1. Processor 107 has now served the "hold" service request and returns to typical call processing at point A of FIG. 5. This processing status is maintained until the next service request is generated.

As described above, the control processor in response to call processing operations monitors the station sets to detect service requests and, following the identification of the type of service request generated from the stations, call processing implements the appropriate feature processing routine to satisfy the request. The feature processing routine processes the service request based on the state of the requesting station as indicated by the status tables contained in the control processor's main memory.

Assume, now, the states indicated in the post-hold status tables of FIGS. 3 and 4 for station set 100-0 are current where station set 100-0 is "off-hook" and is maintaining an active "non-talk" connection with station 100-1 on identified call connection A. Station set 100-0 user has placed station set 100-1 user "on-hold". During this hold interval, the station set 100-1 user merely sets down his receiver and waits for a notification indicating the removal of the hold condition by the station set 100-0 user. Assume further that station set 100-0 user has dropped out of the B call connection, which was, as the pre-hold call status table of FIG. 4 indicates, a conference call connection. It is not necessary, however, that station set 100-0 user completely disengage from the established call connection, call connection B, to re-engage in a voice connection on another call connection, call connection A. Station set 100-0 user can place as many parties on hold as there are active call connections, but only one active voice connection can exist at a time. However, for ease of description assume that only one call is "on-hold", and that station set 100-0 user has completely disengaged from the established conference connection B.

Assume, now, that station set 100-0 user wishes to resume a "talk" state connection with station set 100-1 user who is currently "on-hold" and awaiting the resumption of the voice connection between the two parties. Assume further that station set 100-0 user generates an "un-hold" service request by depressing the call appearance associated with the held call. Processor 107 has identified the "un-hold" service request and completed steps 501 through 506 of FIG. 5 to reach step 508. If the service request was inappropriate, as previously described, then, typical call processing is resumed at step 500. However, since the "un-hold" service request is valid, i.e. a hold condition currently exists, processing proceeds to point C of FIG. 7. In response to the "un-hold" service request, control processor 107 begins processing at step 700 of FIG. 7.

Control processor 107 retrieves the identity of the requesting station, station set 100-0, from its main memory. Processor 107, then, scans the post-hold station status table of FIG. 3, to determine if station set 100-0 is off-hook, steps 701 and 702. As the post-hold station status table of FIG. 3 indicates, station 100-0 is currently "off-hook", 1. If station set 100-0 user is "on-hook", processor 107 abandons the service request and returns to point A of FIG. 5 to await another service request since the state of the requesting station is inappropriate for the generated service request. However since the appropriate state exists, processor 107 then proceeds to step 703 and retrieves the identity of the connection, A, from its main memory. Processor 107 concurrently scans the post-hold call status table of FIG. 4, step 704, to detect the identified connection of the requesting station. As the post-hold call status table indicates, station set 100-0 is associated with connection A which matches the identified call connection retrieved from the main memory, step 705. Again, this determination is to prevent a mis-service to the requesting station on the wrong connection such as if connection B were still associated with station set 100-0. If no match occurred, then, processing returns to point A of FIG. 5; however, a valid match exists. Processor 107, then, scans at step 706, the post-hold call status table of FIG. 4 to determine if station 100-0 on connection A is in the "non-talk" state, 1. If "non-talk" is not the current state, call processing returns to point A of FIG. 5 to await another service request since the appropriate state associated with the service request is not present. To service an "un-hold" service request, the "non-talk" state must exist because the purpose of an "un-hold" request is to re-establish a "talk-state." As illustrated on FIG. 4 in the post-hold call status table, station 100-0 is in the "non-talk" state on connection A. Processor 107 proceeds to step 707 and returns the requesting station to the "talk" state on the identified connection A. At this point, the "hold" condition has been removed from the requesting station. Control processor 107, concurrently, updates a call status table (not shown) to reflect that the station set 100-0 user is now in the "talk" state on call connection A.

Steps 700 through 707 define the states for detecting when the station of an activating party is changed from a "hold" to an "un-hold" state, that is, removal of the hold condition. Following the removal of the hold condition, processor 107 immediately re-establishes a voice connection between the activating party and the held party, station 100-0 and station 100-1. The parties on the connection may now converse. However, the previously held party must be notified as to the re-establishment of the voice connection between the parties. The remaining steps, 708 through 710 of FIG. 7, cause the control processor to immediately generate a notification indication to the held party to signal the conclusion of the hold interval such that conversation between the parties may resume.

Control processor 107 scans the post-hold call status table to identify if any other stations are included in the identified call connection A, step 708. As the post-hold call status table indicates, station set 100-1 is included in the identified call connection A, step 709. Processor 107, in response to identifying a station included on the identified call connection, generates a notification indication, e.g. a "ring-ping", to the identified station, step 710. This notification indicates that the hold condition has been removed and that the voice connection has been re-established. The "ring-ping" type of notification alerts the held party of the resumption of the "talk" state. It is well-known that a station of the type described in FIG. 2 includes a mechanism 208 responsive to signals from the control processor, to generate an audible ringing burst and therefore, no further details are described. In the present case, the held party does not rely on aural monitoring of the station's receiver to hear the voice of the activating party to determine when the talk state is resumed.

Processor 107 repeats steps 708 through 710 to notify each of the stations included on the connection. This process of sequential notification occurs, for example, in a conference call connection where several held parties are involved in the connection. If no further stations require notification, the call processing routine returns to point A of FIG. 5. Processor 107 then resumes typical call processing operations and awaits another service request from any of the station sets 100-0 through 100-n.

In the above described manner, a held party or parties need not aurally monitor the station's receiver for the voice of the activating party to signal the conclusion of the hold interval and the re-establishment of the voice connection. The held party merely sets down the station's receiver and continues other activities until a notification is generated at the conclusion of hold interval. The above described feature processing arrangement monitors the states of the requesting station to detect when an "un-hold" condition exists and then, provides immediate notification to the held party or parties indicating the removal of the hold condition. Notification may be provided via an audible, visual, or tactile indication.

What is claimed is:

1. In a switching system in which a call connection has been established between a first station and a second station and wherein a party at said first station has placed said second station in a "hold" state; a method of providing notification to a party at said second station to indicate the termination of the "hold" state at said first station, said method comprising the steps of:
    (1) generating a service request at said first station to request removal of said "hold" state;

(2) responding to the receipt of said generated service request to convert said first station from a "non-talk" state to a "talk" state, including
  (i) identifying said first station on said connection to detect a current state of said first station,
  (ii) responding to said detected current state to verify the existence of said "hold" state, and
  (iii) responding to said verified "hold" state to change to an "unhold" state associated with the termination of said "hold" state; and
(3) responding to said conversion of said first station to said "talk" state to transmit to said second station an indication of the removal of the "hold" state at said first station.

2. The method of claim 1 wherein the step of responding to transmit further includes the steps of:
identifying said second station on said connection to activate at said second station an indicator indicative of the removal of the "hold" state at said first station.

3. The method of claim 2 wherein the step of identifying to activate further includes the step of:
providing a visual indication at said second station to indicate said termination of the "hold" state at said first station.

4. The method of claim 2 wherein the step of identifying to activate further includes the step of:
providing an audible indication at said second station to indicate said termination of the "hold" state at said first station.

5. The method of claim 2 wherein the step of identifying to activate further includes the step of
providing a tactile indication at said second station to notify a party at said second station of said termination of the "hold" state at said first station.

6. In a switching system in which at least two call connections have been established each between a first station and at least one other station and wherein a party at said first station has placed said other stations on said call connections in a "hold" state; a method of providing notification to held parties at said other stations to indicate the termination of the "hold" state at said first station, said method comprising the steps of:
(1) generating a service request at said first station to request removal of said "hold" state on one of said connections;
(2) responding to the receipt of said generated service request to convert said first station from a "non-talk" state to a "talk" state on said one of said connections, including
  (i) identifying said first station on said one of said connections to detect a current state of said first station,
  (ii) responding to said detected current state to verify the existence of said "hold" state, and
  (iii) responding to said verified "hold" state to change to an "unhold" state associated with said termination of said "hold" state on said one of said connections, and
(3) responding to said conversion of said first station to said "talk" state on one of said connections to transmit to at least one of said other stations on said one of said connections an indication of the removal of the "hold" state at said first station.

7. The method of claim 6 wherein the step of responding to transmit further includes the steps of:
identifying said one of said other stations on said one of said connections to activate at said one of said other stations an indicator indicative of the removal of the "hold" state at said first station.

8. In a switching system in which a conference call connection has been established between a first station and at least two other stations and wherein a conferee at said first station has placed said other stations in a "hold" state; a method of providing notification to conferees at said other stations to indicate the termination of the "hold" state at said first station, said method comprising the steps of:
(1) generating a service request at said first station to request removal of said "hold" state;
(2) responding to the receipt of said generated service request to convert said first station from a "non-talk" state to a "talk" state, including
  (i) identifying said first station on said conference connection to detect a current state of said first station,
  (ii) responding to said detected current state to verify the existence of said "hold" state, and
  (iii) responding to said verified "hold" state to change to an "unhold" state associated with the termination of said "hold" state; and
(3) responding to said conversion of said first station to said "talk" state to transmit to said other stations an indication of the removal of the "hold" state at said first station.

9. In a switching system in which a conference call connection has been established between a first station and at least two other stations and wherein a conferee at said first station has placed said other stations in a "hold" state; a method of providing notification to conferees at said other stations to indicate the termination of the "hold" state at said first station, said method comprising the steps of:
(1) generating a service request at said first station to request removal of said "hold" state;
(2) responding to the receipt of said generated service request to convert said first station from a "non-talk" state to a "talk" state; and
(3) responding to said conversion of said first station to said "talk" state to transmit to said other stations an indication of the removal of the "hold" state at said first station, including
  (i) identifying one by one in sequence each of said other stations on said conference connection, and
  (ii) responding in sequence to each of said identifications to activate on each of said other stations an indicator indicative of the termination of the "hold" state at said first station.

10. In a PBX serving a plurality of stations wherein each of said stations is associated with some specified status on each established connection and where a call connection is established between a first station and a second station and said first station has a non-communicative status indicative of having placed said second station "on-hold", a method of providing notification to a held party at said second station to indicate the termination of a "hold" condition at said first station, said method comprising the steps of:
(1) generating a service request at said first station to request removal of the hold condition;
(2) responding to the receipt of said generated service request to convert said non-communicative status of said first station to a communicative status, including (i) identifying said first station on said connection to detect a current state of said first station, (ii) responding to said detected current state to verify an existence of a valid current state associated with said non-communicative status, and (iii) responding to said verified valid current state to change said current state to an invalid state associated with said communicative status, and (3) responding to said conversion to said communicative status to transmit to said second station an indication of the removal of the hold condition at said first station.

11. The method of claim 10 wherein the step of responding to transmit further includes the steps of:

identifying said second station on said connection to activate at said second station an indicator to register said termination of the hold condition at said first station.

12. The method of claim 11 wherein the step of identifying to activate further includes the step of:

providing a visual indication at said second station to notify the held party of said termination of the hold condition at said first station.

13. The method of claim 11 wherein the step of identifying to activate further includes the step of:

providing an audible indication at said second station to notify the held party of said termination of the hold condition at said first station.

14. The method of claim 11 wherein the step of identifying to activate further includes the step of:

providing a tactile indication at said second station to notify the held party of said termination of the hold condition at said first station.

* * * * *